Aug. 25, 1953
J. W. KAYE
2,649,815
LEVER SYSTEM FOR STEAM TRAPS
Filed Dec. 12, 1947
2 Sheets—Sheet 1
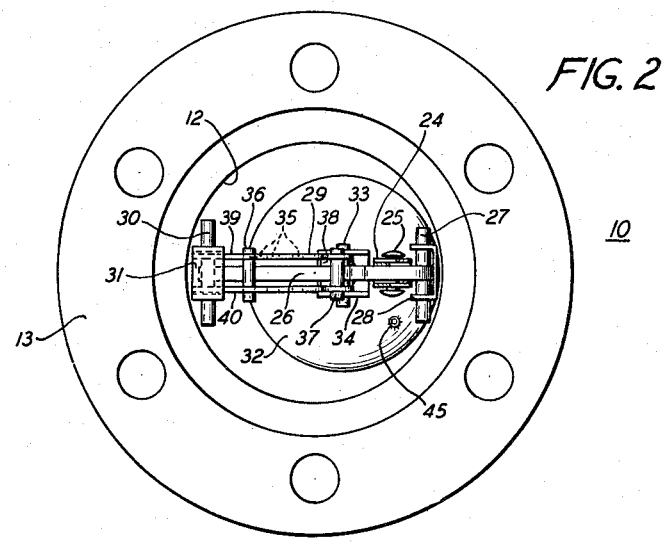
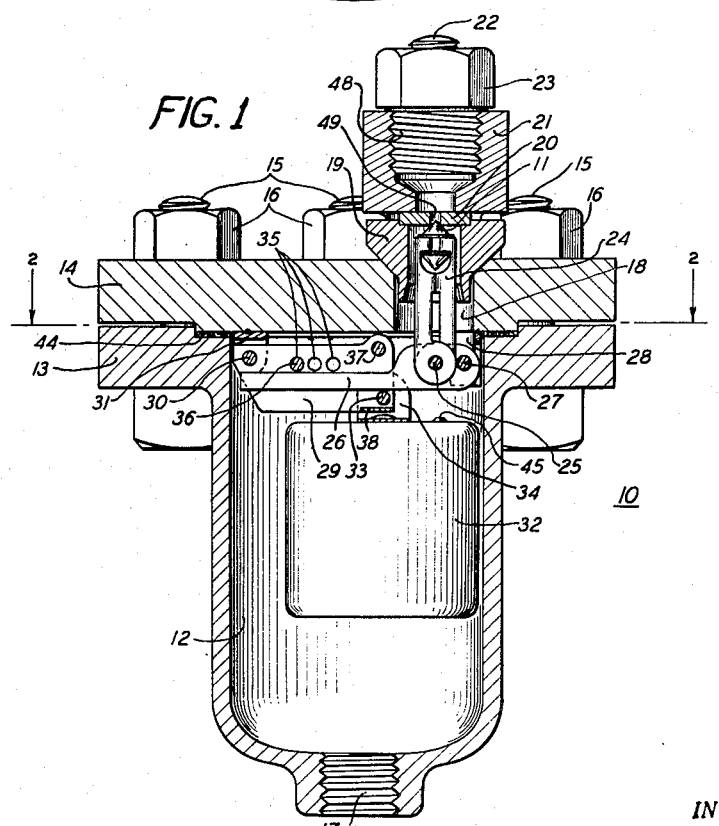
INVENTOR.
J. W. KAYE
BY Hugh S. Wertz
ATTORNEY Aug. 25, 1953    J. W. KAYE    2,649,815
LEVER SYSTEM FOR STEAM TRAPS
Filed Dec. 12, 1947    2 Sheets-Sheet 2
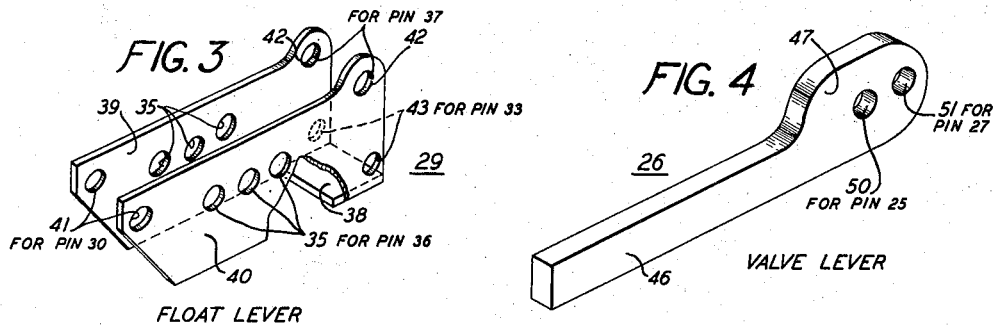
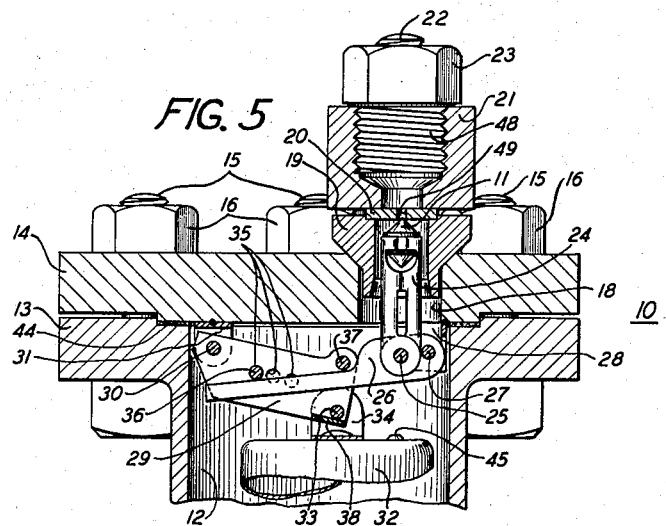
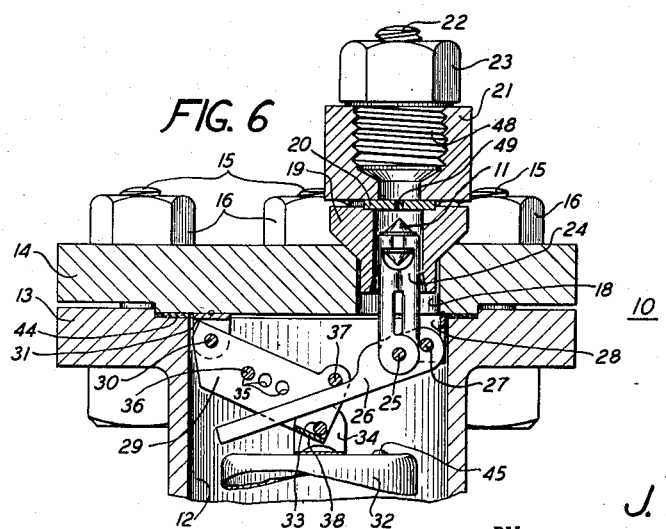
INVENTOR.
J. W. KAYE
BY
Hugh S. Wertz
ATTORNEY

Patented Aug. 25, 1953

2,649,815

UNITED STATES PATENT OFFICE 2,649,815

LEVER SYSTEM FOR STEAM TRAPS

James W. Kaye, Montclair, N. J., assignor to Kaye & MacDonald, Inc., West Orange, N. J., a corporation of New Jersey Application December 12, 1947, Serial No. 791,295

2 Claims. (Cl. 74—516)

This invention relates to lever systems and more specifically to compound lever mechanisms for operating the valves in certain types of steam traps.

Patent 2,276,201 issued March 10, 1942, to James W. Kaye discloses a float-type steam trap having a compound lever mechanism comprising a float lever and a valve lever for operating the valve. The mechanism is such that there is a high leverage or mechanical advantage to open the valve but this leverage decreases as the valve opening increases. This is caused by the fact that as the float lever is pulled downward by the float (as the float chamber fills with water), the line of contact between the float lever and the valve lever moves toward the center of the trap, thus decreasing the power to open the valve as the float falls. Under certain conditions, when the float is falling very slowly, it is possible that there may be enough force to start the valve opening, but, as the mechanical advantage is decreased, the force to open the valve comes into balance with the force tending to hold it closed which causes the valve to balance in a partially open position and the steam trap accordingly dribbles.

It is an object of this invention to provide a steam trap lever system of the compound lever mechanism type which does not have the above-mentioned disadvantage.

It is another object of this invention to provide a float-type steam trap lever system in which the mechanical advantage of the lever system for opening the valve in the trap increases for a period of time after the valve starts to open.

It is a further object of this invention to provide a float-type steam trap lever system which employs a very high mechanical advantage to open the valve in the trap but a very low mechanical advantage to close the valve.

These and other objects are attained in accordance with the invention by providing a steam trap employing a float for operating a valve through a compound lever mechanism as in the arrangement disclosed in the above-mentioned Kaye patent, the lever mechanism, however, being specifically different from that of the Kaye patent. In the preferred embodiment of the present invention, which is described by way of example, the compound lever mechanism comprises a valve lever attached to the valve and a float lever which pivots around a pin fastened in the upper inside portion of the float chamber and has its other end connected to the float, the float lever being channel shaped with a large portion of the channel rib removed so that the valve lever can fall through it when the latter assumes a downward position. The float lever is provided with an intermediate pin (between the pivot point and the float) and this pin contacts the valve lever and pulls it downward when the float drops to open the valve (when the float chamber is filled with water). As the float descends, the mechanical advantage increases as the line of contact between the intermediate pin and the valve lever moves away from the pivot point of the valve lever exerting more force to continue the opening of the valve. After the valve has been opened sufficiently to overcome the force of the pressure within the casing, the weight of the valve lever alone pulls the valve wide open and the great mechanical advantage initially utilized to pull the valve off the seat is no longer necessary. For this reason, an additional pin has been positioned in the upper portion of the float lever at the end thereof near the valve and when this additional pin contacts the valve lever, the valve is opened at a faster rate because the additional pin travels downward at a faster rate than the intermediate pin. In closing the valve, the pivot pin between the float and the float lever contacts the valve lever and the valve is quickly closed with a small mechanical advantage.

The invention will be more readily understood by referring to the following description taken in connection with the accompanying drawings forming a part thereof, in which:

Fig. 1 is a vertical cross-section of a steam trap lever system in accordance with the invention, the valve of the trap being shown in the closed position;

Fig. 2 is a plan view of the steam trap of Fig. 1 with the portion above line 2—2 in Fig. 1 removed;

Fig. 3 is a perspective view of the float lever of the steam trap of Fig. 1;

Fig. 4 is a perspective view of the valve lever of this trap;

Fig. 5 is a vertical cross-section of the upper portion of the steam trap of Fig. 1 with the valve thereof shown in the partially opened position; and Fig. 6 is a vertical cross-section of the same portion of this trap with the valve being shown in the fully opened position.

Referring more specifically to the drawings, Figs. 1, 5 and 6 show, by way of example for purposes of illustration, a steam trap 10 with the reversible valve 11 therein in the closed, partially opened and fully opened positions, respectively. The trap 10 comprises a cylindrical casing 12 having a flange 13 adapted to support a cover 14 which is fastened to the casing by bolts 15 and nuts 16. A gasket 44 provides a seal between the casing 12 and the cover 14. The bottom of the casing 12 has an inlet opening 17 which is tapped to receive a pipe which is being drained or which is connected to a unit being drained. The cover 14 has an opening 18 therein within which is supported the valve body 19 recessed to receive a reversible valve seat 20. The valve body 19 is held against the cover 14 by the force of the outlet cap 21 being transmitted through the valve seat, the cap being held tightly against the valve seat by studs 22 and stud nuts 23. A guide 24 for the valve is connected by means of pivot pin 25 to the valve lever 26 which is pivoted around pin 27 in bracket 28 fixed to the cover 14. The valve lever 26 is actuated by the float lever 29. The lever 29 is pivoted at its upper end around pivot pin 30, held by a U-shaped bracket 31 which straddles the float lever 29 and is firmly affixed to the cover 14, and is connected at its lower end to the float 32 by means of pin 33 and U-shaped bracket 34. The float 32 is of any standard inverted bucket type and is provided with the usual vent hole 45. The bracket 34 straddles lever 29 and is firmly attached to the float 32. The float lever 29 has a plurality of pairs of holes 35 therein, in one pair of which is placed the removable pin 36.

Reference will now be made to Fig. 3 which shows in perspective the float lever 29. This lever is channel shaped with a large portion of the channel rib removed leaving only a small remainder 38 at the right hand portion thereof. The sides 39 and 40 are provided with pairs of holes 35 to receive the pin 36. The upper left hand portions of the sides have holes 41 for the pin 30, the upper right hand portions thereof have holes 42 for pin 37 and the lower right hand portions of the sides 39 and 41 have holes 43 for the pin 33. The removable pin 36 may be placed in any pair of holes 35.

Fig. 4 shows in perspective the valve lever 26. This lever has a lower portion 46 and an upper widened portion 47 having a hole 50 to receive pin 25 and a hole 51 for pin 27. The portion 46 projects between pins 37 and 33 as shown in Figs. 1, 5 and 6.

The operation of the steam trap 10 will now be described. The trap is placed in a vertical position as shown in Fig. 1 with the unit being drained piped to 17 and the threaded opening 48 in the outlet cap 21 piped to a return or drain. Under operating conditions, the casing 12 is completely filled with water. With no condensate entering the trap 10, the float 32 is approximately two-thirds filled with steam and buoyed to the top-most position (shown in Fig. 1) with pin 33 bearing against the valve lever 26. The valve 11 is held against the valve seat 20 by the pressure within the casing 12. Any air entering the float 32 passes through the vent 45 therein and is discharged with the condensate. As condensate reaches the trap, the steam in the float 32 is displaced by the water until the float is no longer buoyant and begins to sink. As the float 32 drops, it remains vertical as it pivots around the pin 33 and pulls float lever 29 down, the latter being pivoted at the pin 30. This causes the intermediate pin 36 in one of the pairs of holes 35 to come into contact with the valve lever 26 and force this lever downward, it being pivoted around pin 27. As the valve lever is forced downward at the pin 36, the valve 11 is pulled away from its seat 20 until the force of the pressure holding the valve shut is overcome and the valve opens. It will be noted that a tremendous mechanical advantage is obtained with this compound leverage. What is most important, however, is the fact that as the float descends, the mechanical advantage increases for as pin 36 describes an arc about the pivot 30, the line of contact between the pin 36 and the lever 26 moves away from the pivot 27 (as shown in Fig. 5), exerting more force downwardly on the lever 26 and in turn on the valve 11. This is in contrast to the arrangement described in the above-mentioned Kaye patent where the mechanical advantage tends to decrease as the float falls.

After the valve 11 has been opened sufficiently to overcome the force of the pressure within the casing 12, the weight of the valve lever 26 alone pulls the valve 11 wide open and the great mechanical advantage initially utilized to pull the valve 11 off the seat 20 is no longer necessary. It is for this reason that pin 37 is so positioned on the float lever 29 that it makes contact with valve lever 26 shortly after the valve 11 has left the seat 20. Thus, as the float 32 descends, the pin 37 moves downwardly at a faster rate than the pin 36, pulling the valve 11 far away from its seat 20, thereby providing a free and clear orifice 49 for the passage of condensate as shown in Fig. 6. In addition to providing a wide open valve, pin 37 eliminates the possibility of the valve 11 fluctuating or fluttering on or off its seat 20 due to the velocity of the water rushing past it. Once the float 32 begins to fall, discharge of condensate is positive and continuous until the float rises.

When no condensate is coming into the trap 10, steam enters the casing 12 via the opening 17. It enters the float 32, displacing the water inside it, and the float becomes buoyant and begins to rise. As the float 32 rises, pin 33 bears against lever 26 and moves the valve 11 into the closing position (Fig. 1), holding the valve tightly against its seat 20. It should be noted that although a very high mechanical advantage is employed to open the valve 11 against the high pressure within the casing 12, very little leverage is employed in closing the valve. This feature eliminates shock to the valve and mechanism which would occur if the same high mechanical advantage used to open the valve 11 were used to close it.

The three pairs of holes 35 provided in the valve 29 to receive pin 36 make it possible to handle a greater number of operating conditions with one valve size by moving pin 36 to the most suitable pair of holes 35. For example, a trap 10 properly installed for a certain line pressure might normally have a valve size so that the trap 10 works most efficiently with the pin 36 in the center pair of holes 35. If, however, it becomes desirable to increase the pressure at which the trap 10 is to operate, the pin 36 can be moved to the pair of holes 35 nearest the pivot pin 30, increasing the mechanical advantage operating to pull the valve 11 open at this higher pressure and still use the same valve 11 and its seat 20. Thus a great variety of conditions can be efficiently handled by the interchange of the pin 36 in combination with the easily changed and reversible valve 11 and seat 20. For a more detailed description of the reversible valve 11 and valve seat 20 assembly briefly described above, reference is made to Patent 1,960,999 issued May 29, 1934, to James W. Kaye.

Various modifications can be made in the embodiment described above without departing from the spirit of the invention, the scope of which is indicated by the claims.

What is claimed is:

1. A motion transmitting lever system for a steam trap adapted to move a first member in response to the movement of a second member comprising a first lever pivoted around a stationary pivot near one end thereof and having a substantially straight free end portion extending from the other end of said lever at least half the length thereof toward the pivot, said first lever being connected to the first member at a point in the lever between the pivot and said other end but much nearer the pivot than said other end, and a second lever pivotally supported near one end and pivotally connected to the second member near its other end, said second lever carrying a pin intermediate the pivots therein which engages the free end portion of the first lever when the second member is moved in a certain direction, the two levers being positioned so that the contact point between said pin and first lever moves farther away from the pivot point of said first lever as the first member is moved in said certain direction thus increasing the mechanical advantage of the lever system formed by the said levers, said second lever comprising a channel shaped member having two sides and a narrow rib between them at the end of the second lever connected to the second member and carrying said pin between the sides thereof to engage the top of the free end portion of said first lever as it passes through the second lever between the sides thereof when the second member moves in said certain direction.

2. The combination of elements as in claim 1 in which said second lever has a plurality of pairs of apertures therein at different portions thereof, one of each pair being in a respective side opposite the other of said pair and within any chosen pair of which said pin is adapted to be inserted.

JAMES W. KAYE.

References Cited in the file of this patent

UNITED STATES PATENTS

| Number | Name | Date |
|---|---|---|
| 544,744 | Nilsen | Aug. 20, 1895 |
| 557,693 | Nilsen | Apr. 7, 1896 |
| 629,765 | Buchner | Aug. 1, 1899 |
| 822,629 | Phillips | June 5, 1906 |
| 1,085,719 | Andersen | Feb. 3, 1914 |
| 1,586,136 | Winterborne | May 25, 1926 |
| 1,848,896 | Martindill | Mar. 8, 1932 |
| 1,895,084 | Peltier | Jan. 24, 1933 |
| 1,960,999 | Kaye | May 29, 1934 |
| 2,087,885 | Fleishel | July 27, 1937 |
| 2,276,201 | Kaye | Mar. 10, 1942 |
| 2,315,632 | Martindill | Apr. 6, 1943 |
| 2,550,643 | Mainwaring | Apr. 24, 1951 |